UNITED STATES PATENT OFFICE.

ISAAC WELLS, OF WILMINGTON, NORTH CAROLINA, ASSIGNOR TO HIMSELF, JAMES F. POST, OF SAME PLACE, AND DAVID D. BARBER, OF SUMTER COUNTY, SOUTH CAROLINA.

IMPROVEMENT IN EXTRACTS FOR TANNING LEATHER.

Specification forming part of Letters Patent No. 198,478, dated December 25, 1877; application filed August 27, 1877.

*To all whom it may concern:*

Be it known that I, ISAAC WELLS, of Wilmington, in the county of New Hanover and State of North Carolina, have invented certain new and useful Improvements in Extracts for Tanning Leather; and I do hereby declare the following to be a full, clear, and exact description of the invention, such as will enable others skilled in the art to which it pertains to make and use it.

My invention relates to improvements in extracts for tanning leather; and consists in the following-described process for preparing the same.

The weed commonly known as "May-weed," with all the varieties of the species which, in botany, is called *Anthemis cotula*, is taken when green, after being cut but a few days, and is first cut up, ground, and passed through pressure-rollers. The liquid produced by this squeezing through the rolls is collected in a suitable vessel, and forms a part of the entire quantity of extract which is obtained during the several stages of the process.

The great amount of the liquid of the weed is extracted by the above treatment; but that which still remains adherent is extracted as follows: The mass or pulp weed is then moistened by steam, next pressed by a suitable press and follower, and the extract obtained therefrom is passed by conduit, such as pipe governed by a cock, into a second receiving-vessel. When the power of the press is exhausted, and all of the compressed liquid has passed from the latter into this receiving-vessel, the communication between the press and the latter vessel is closed. The mass within the press is then subjected to air-suction by an ordinary air-pump, or other suitable means of exhaust, to remove the residual liquid; and, finally, it is treated with diluted sulphuric acid. The strength of this diluted acid is very slight, and preferably I use but about five pounds of the acid proper in treating one thousand pounds of the mass, the said five pounds of acid being sufficiently diluted by water to allow of the mere moistening of the mass therewith. This is applied at the ordinary temperature, and no material effect or difference appears by having this diluted acid warmer or colder.

The said mass, after being treated in this manner for about half an hour, is then removed from the press, and from the liquid which is extracted from it by this third and last step in the process. The liquid thus obtained is allowed to remain exposed to the open air for half an hour or an hour. This exposure has the effect to free the liquid of any perceptible trace of the diluted acid above referred to.

The three different quantities of extract, respectively produced at the several stages of the operation above described, are then put together, and constitute the article as ready for use. This series of steps in the treatment of the weed extracts the tannic acid contained therein as an ooze in distinction from a decoction. In the latter case a large quantity of water is necessary, and the tanning solution of the weed is weakened thereby, while on the other hand, by cutting, grinding, and compressing the weed, followed by steaming the mass, subjecting the latter to pressure, then exhausting the same by air-suction, and finally treating it with sulphuric acid, as described, the following result is obtained: The tannic acid is extracted in full quantity from the weed, and in a slightly-diluted form as an ooze, instead of a decoction. It is now fit for use.

Having fully described my invention, what I claim as new, and desire to secure by Letters Patent, is—

The herein-described process of preparing an extract for tanning leather, the same consisting in cutting, grinding, and pressing May-weed, then steaming and pressing the residual mass, and, after subjecting the same to an air-exhaust process, treating it with diluted sulphuric acid, subjecting the resulting liquid to open-air exposure, and finally uniting the several liquids into one quantity, all substantially as set forth.

ISAAC WELLS.

Witnesses:
J. W. LAMB,
R. Q. GRANT.